US005786649A

United States Patent [19]
Roberts

[11] Patent Number: 5,786,649
[45] Date of Patent: Jul. 28, 1998

[54] ROTARY ELECTROMAGNETIC ACTUATOR

[76] Inventor: Dafydd Roberts, Egin Cyfyngedig, Snowdonia BIC, Llys-y-Fedwen, Parc Menai, Bangor, Gwynedd, LL57 4BF, United Kingdom

[21] Appl. No.: 776,164

[22] PCT Filed: Jun. 19, 1995

[86] PCT No.: PCT/GB95/01445

§ 371 Date: Dec. 27, 1996

§ 102(e) Date: Dec. 27, 1996

[87] PCT Pub. No.: WO96/00971

PCT Pub. Date: Jan. 11, 1996

[30] Foreign Application Priority Data

Jun. 28, 1994 [GB] United Kingdom .................. 9412941

[51] Int. Cl.[6] ............................ H02K 7/20; H02K 33/00

[52] U.S. Cl. ............................ 310/112; 310/36; 335/276; 335/279

[58] Field of Search .................................... 310/112, 113, 310/114, 49 R, 261, 254, 162, 166, 168, 257, 36; 335/276, 203, 270, 272, 279

[56] References Cited

U.S. PATENT DOCUMENTS

| | | | |
|---|---|---|---|
| 4,041,429 | 8/1977 | Parker et al. | 335/276 |
| 4,088,909 | 5/1978 | Matsumura et al. | 310/49 R |
| 4,162,418 | 7/1979 | Kawaki et al. | 310/49 R |
| 4,206,375 | 6/1980 | Sudler | 310/49 R |
| 4,587,971 | 5/1986 | Stolfi et al. | 128/660 |
| 4,629,924 | 12/1986 | Grosjean | 310/257 |
| 4,634,906 | 1/1987 | Grosjean | 310/49 R |
| 4,680,494 | 7/1987 | Grosjean | 310/156 |
| 4,999,531 | 3/1991 | Mavadia et al. | 310/23 |
| 5,132,578 | 7/1992 | Iwasa et al. | 310/49 R |
| 5,302,875 | 4/1994 | Taghezout | 310/156 |

FOREIGN PATENT DOCUMENTS

| | | |
|---|---|---|
| 791405 | 12/1935 | France . |
| 2201575 | 4/1974 | France . |

*Primary Examiner*—Thomas M. Dougherty
*Assistant Examiner*—Michael J. Wallace, Jr.
*Attorney, Agent, or Firm*—Bliss McGlynn, P.C.

[57] ABSTRACT

A rotary electromagnetic actuator comprises a rotatable shaft carrying a rotor which is rotatable relative to a stator. A magnetic circuit is set up which comprises the stator and the rotor, the reluctance of the magnetic circuit being dependent on the relative rotational orientation of the rotor and stator and decreasing in a particular direction of rotation such that the reluctance is a minimum at an equilibrium position to which the rotor is therefore biased. The rotor is selectively impelled to advance away from the equilibrium position, subsequently again becoming part of a magnetic circuit, the reluctance of which decreases in the direction of rotation to a minimum at an equilibrium position to which the rotor becomes biased. The actuator provides undirectional rotation for successive actuations at substantially uniform torque and is suitable for use in actuating rotary devices such as rotary valves.

18 Claims, 8 Drawing Sheets

ROTARY ELECTROMAGNETIC ACTUATOR

The present invention relates to a rotary electromagnetic actuator. More particularly, the invention relates to an improved Rotary Electromagnetic Actuator suitable for, but not limited to, actuating rotary valves.

Rotary electromagnetic actuators are presently used in a variety of industrial and scientific applications. Examples of such applications include automatic liquid dispensing devices and fuel regulators. Some examples of known electromagnetic actuators are shown in GB1461397 (C.A.V. Limited), GB275942 (General Railway Signal Company), US5337030 (Mohler) and WO90/02870 (Robert Bosch GmbH).

The actuator shown in GB1461397 contains a shaft rotatably mounted between the pole pieces of an electromagnet. A rotor member is attached to the shaft and is shaped such that when a current is applied to the coil, the shaft will tend to rotate to a position of least reluctance. It is not clear from the '397 patent what will happen when current stops being applied to the coil.

GB275942 shows an electromagnetic actuator used in railway signalling devices. FIG. 5 of the patent, and the related text, disclose a shaft having a first electromagnetic coil wound around it. A shaped rotor member is attached to the shaft and a stator member is also provided. A second electromagnetic coil acts to magnetize the stator member when energised. When the first coil is also supplied with current, the shaft will tend to rotate until a position of least reluctance is reached. When the current supply to the first coil ceases, the shaft will rotate back to the starting position. The device of the '942 patent therefore operates to rotate the shaft forward to a particular position and then allow it to fall back again. US5337030 shows a permanent magnet brushless torque actuator. A rotatable shaft carries a rotor with an even number of magnetised regions, adjacent regions being permanently magnetised in opposite directions. An electromagnetic assembly is shown arranged so that energisation of the electromagnet assembly causes the shaft to tend to a position where the permanent magnetic regions are aligned with the magnetisation of the electromagnet assembly. A spring is shown which biases the rotor to its zero position when the electromagnet is not energised, the shaft being free to rotate in either direction upon energisation. However, work must continually be done to overcome the biasing force of the spring. If the spring is not used, a complicated and costly feedback position sensing means is proposed. Furthermore, unidirectional rotation is not ensured.

W090/02870 discloses an electric rotatory actuator having a shaped rotor with two regions which are permanently magnetised in opposite directions, rotating within the shaped arms of an electromagnetic stator member. When a coil associated with the stator member is energised, the rotor rotates to a particular position, determined by the amount of current. When no current is supplied, the actuator rotates back to its zero position; rotation of the shaft is therefore not unidirectional. Furthermore, the variable air gap in the device results in a torque which is not constant.

None of the prior art devices shows a device which rotates unidirectionally in a defined way on each actuation. Furthermore, the prior art devices, in order to define the direction of rotation must either have a spring means against which the device is continually having to work, or complicated feedback means, or alternatively a variable air gap resulting in non-constant torque.

It is an object of the present invention to overcome the above disadvantages. Specifically it is an object of the present invention to provide a unidirectionally rotating electromagnetic actuator which is efficient and precisely controllable, while being simple, reliable and inexpensive to manufacture. It is a further object of the invention to provide a rotary electromagnetic actuator which rotates through a defined angle in an accurate, reproducible manner with a high torque. It is a still further object of the invention to provide a rotary electromagnetic actuator which avoids the need either to continually overcome a biasing force or to provide expensive position control means, and in which mechanical stop means are not required.

Prior art actuators such as those described above may be generally described as comprising:

(a) a rotatable shaft arranged to carry a rotor member;

(b) a stator member extending adjacent the path of said rotor member;

(c) means for setting up a magnetic circuit comprising said rotor member and said stator member, the reluctance of said magnetic circuit being dependent on the relative rotational orientation of the rotor member relative to the stator member, said reluctance decreasing in a particular direction of rotation of the rotor relative to the stator to be a minimum at an equilibrium position such that said rotor is biased to said equilibrium position.

The present invention provides that impelling means are actuatable to rotate the rotor to advance away from the equilibrium position, advancement of the rotor subsequently causing said rotor to again become part of a magnetic circuit the reluctance of which decreases in the direction of rotation to a minimum at an equilibrium position such that the rotor becomes biased to a rotationally advanced equilibrium position.

The equilibrium position to which the rotor is subsequently biased after advancement from the first mentioned equilibrium position may be the same as, or different to the first mentioned equilibrium position.

In a preferred embodiment, the actuator comprises a further stator member which is spaced angularly about the shaft and comprises a part of the magnetic circuit, actuation of the impelling means causing advancement of the rotor member from its equilibrium position with the first mentioned stator member towards the further stator member. The further stator member has its own respective equilibrium position with the rotor member, (at which the reluctance of the magnetic circuit is a minimum and dependent on the relative rotational orientation of the rotor member and the further stator member) such that the rotor member becomes biased to its equilibrium position with the further stator member.

It is preferred that actuation of the impelling means is arranged to reverse the direction of the magnetic field in a portion of the circuit, thereby to effect rotational advancement of the rotor member by magnetic repulsion thereof. In one embodiment, the polarity of the magnetic field in the stator member may be reversed; in an alternative embodiment the polarity of the magnetic field in the rotor member may be reversed.

Desirably, means is provided to ensure that the rotational direction of rotational advancement from the equilibrium position is in a specific and predetermined direction upon actuation of the impelling means. The shape of the stator member and specifically the position of the rotor adjacent a circumferential edge of the stator in the equilibrium position provides this. Advantageously, the direction of rotational advancement is the same for successive actuations of said impelling means such that rotation of said rotor member is unidirectional.

It is preferred that the impelling means comprises an electromagnet assembly actuatable to alter the polarity across a portion of the magnetic circuit, preferably the stator member. Advantageously, the electromagnet assembly comprises a coil wound around a portion of said stator member, said coil being supplied with current to effect actuation of said impeller means. In an alternative embodiment, the electromagnetic assembly may comprise a coil having an armature extending thereabout, said armature comprising a portion of said stator.

Preferably, the stator member includes a tapering arm portion extending about the shaft to be adjacent said rotational path of the rotor member, the tapering of the stator being responsible for the dependance of the reluctance of the magnetic circuit upon the relative rotational orientation of the rotor member and the stator member. Desirably, the air gap between the rotor member and the stator member is substantially uniform as the rotor member rotates adjacent the tapering arm portion of the stator member. It is believed a rotary magnetic actuator having a rotor member and a stator member with such a tapering arm provided for the stator member is both novel and inventive per se; the constant air gap ensures that the torque is substantially constant.

It is preferred that upon actuation of said impelling means, rotational advancement of said rotor member and shaft causes the magnetic circuit comprising said rotor member to be temporarily broken.

In one embodiment it is preferred that the magnetic circuit is set up by permanent magnet means, preferably comprising either the stator member or the rotor member, or comprising a permanent magnet means mounted thereto.

Other preferred features of the invention are set out in the appended claims.

Preferred embodiments of the invention will now be described in greater detail by way of example only and with reference to the accompanying drawings, wherein.

In these figures, corresponding parts have been referred to by the same reference numbers.

Figure 1:
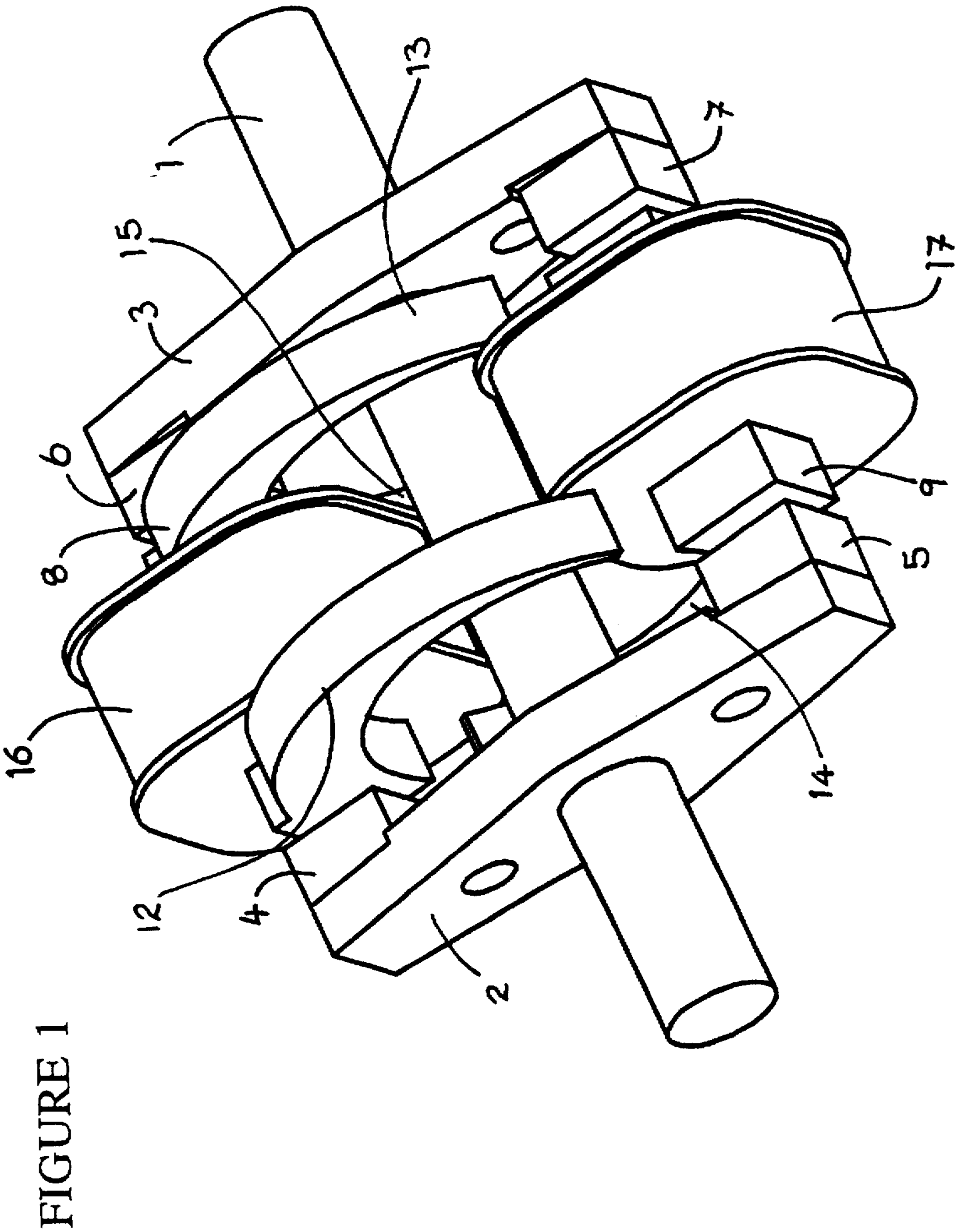
FIG. 1 is an isometric view of an electromagnetic rotary actuator according to the first embodiment of the invention.
Figure 2:
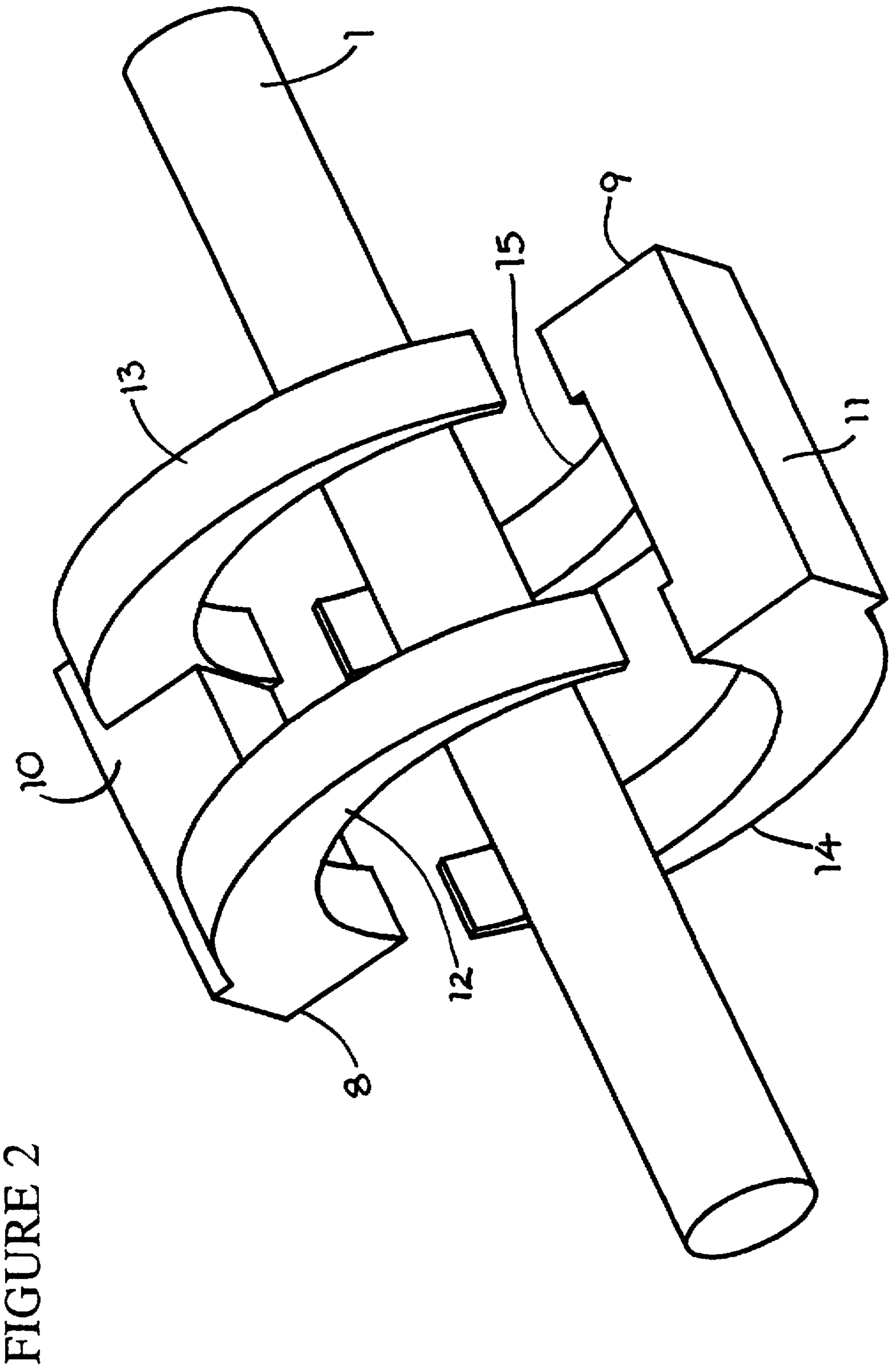
FIG. 2 is similar to FIG. 1 but showing the shaft and claw-shaped stator only.

Referring to FIGS. 1 and 2, a housing (not shown) has rotatably mounted within it a hardened steel shaft 1 upon which are fixedly mounted two rotor members 2 and 3 made of soft iron. Permanent magnets 4,5,6,7 made of e.g. Neodymium Iron Boron are attached to the opposite tip ends of the rotor members 2 and 3. The two rotor members extend so as to be parallel to each other, so that magnet 4 faces magnet 6 and magnet 5 faces magnet 7. Two U-shaped electromagnetic stators 8 and 9 are disposed with the bases 10 and 11 (FIG. 2) of the electromagnetic stators extending in a direction parallel to the axis of shaft 1. The arms 12, 13, 14, 15 of the U-shaped electromagnetic stators 8 and 9 are claw-shaped and curve around shaft 1. The proximal portions of the arms (i.e. the portions nearest the bases 10 and 11) correspond in shape with permanent magnets 4,5,6,7 so as to define equilibrium positions for the rotor members 2 and 3. Solenoid coils 16 and 17 surround the bases (10, 11) of the U-shaped electromagnetic stators 8 and 9. The permanent magnets are magnetized in the direction of the shaft axis and arranged so that the polarity of magnets 4 and 6 is in the opposite direction to that of magnets 5 and 7. For example, if the pole of magnet 4 facing "inward" (i.e. towards the coil) is a North face, then the "inward" face of magnet 5 will be South, the "inward" face of magnet 6 will be South and the "inward" face of magnet 7 will be North. Further, the current supplies to solenoids 16 and 17 are arranged so that the polarities of the coils are always opposite to each other. Thus when no current is applied to solenoids 16 and 17, the rotors will find their equilibrium positions so as to complete the magnetic circuit. If a pulse of current is applied to the coils which magnetizes the electromagnetic stators 8 and 9 in the same direction as the magnetic circuit already created by the permanent magnet, the rotors will already be in an equilibrium position and will remain stationary.

However, if a pulse of current of sufficient magnitude is applied to the coils which magnetizes the electromagnetic stators 8 and 9 in the opposite direction as that of the magnetic circuit already created by the permanent magnet, the rotors will be forced to rotate. Further, the rotation must be in an anticlockwise direction since the permanent magnets attached to the rotors will want to get away from any part of the electromagnetic stator which is of the same polarity as themselves. However, as soon as the shaft has advanced rotationally by a small amount, the permanent magnets will be attracted towards the other electromagnetic stators (which have opposite polarity) with a force which will depend on the rate of taper of the claws. If the current is then switched off, the shaft will come to a halt at the next equilibrium position, having rotationally advanced through 180°. This process may be repeated so that an actuation of the shaft through 180° is obtained with every current pulse of alternating polarity. This shaft may be used to drive, e.g. the valve means of an autosampler.

Figure 4:
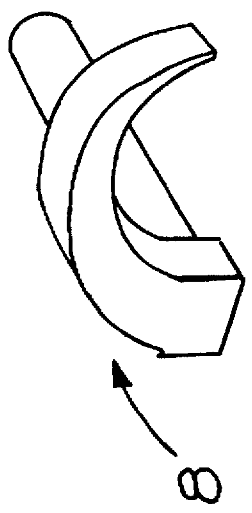
FIG. 4 shows one of the L-shaped stators of FIG. 3.
Figure 3:
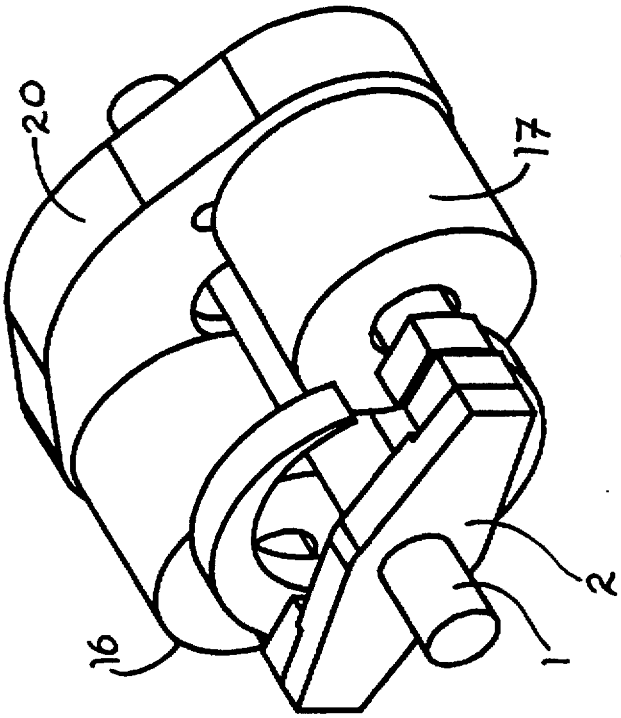
FIG. 3 shows an alternative construction of the device.
Figure 5:
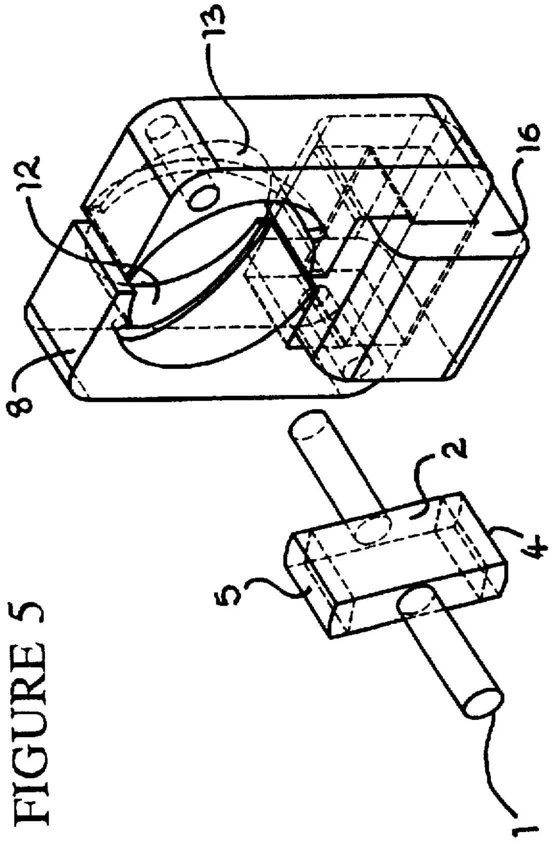
FIG. 5 is an isometric view of an electromagnetic rotary actuator according to another aspect of the invention.
Figure 6:
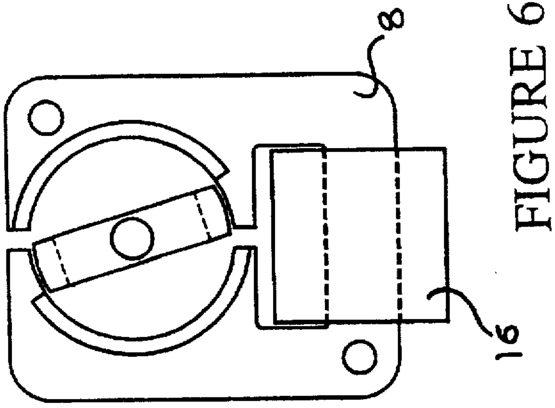
FIG. 6 is a front elevation of the device shown in FIG. 5.
Figure 7:
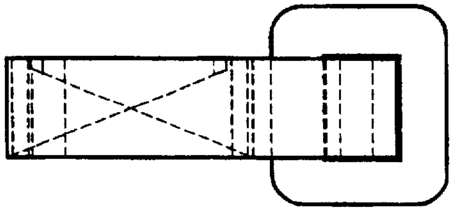
FIG. 7 is an end elevation of the electromagnetic stator and coil of the FIG. 5 device.
Figure 8:
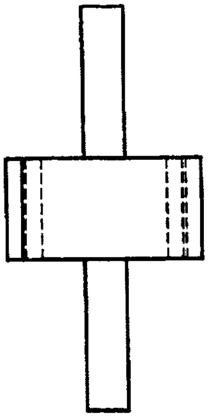
FIG. 8 is an end elevation of the rotor and shaft of the FIG. 5 device.

An alternative construction is shown in FIGS. 3 and 4. In this device, only one rotor member 2 is mounted to shaft 1, the magnetic circuit being completed by a magnetically permeable back plate 20. FIG. 4 shows the construction of stator member 8 (9 being identical), the stator being L-shaped and having a claw-shaped pole arm.

A further aspect of the invention will now be described with reference to FIGS. 5,6,7 and 8. In these figures, a housing (not shown) has rotatably mounted within it a hardened steel shaft 1 upon which is fixedly mounted a rotor member 2 made of soft iron. Permanent magnets 4,5, made of e.g. Neodymium Iron Boron are attached to the opposite tip ends of the rotor member 2. The rotor member extends diametrically outwards from the shaft, the magnetic axes of magnets 4 and 5 being aligned and arranged so that their extremes have opposite polarities . An U-shaped electromagnetic stator 8 has two pole faces which extend cylindrically around the shaft axis, each pole face being shaped so that it tapers from a relatively massive end to a relatively less massive end to have a tapering face. The pole faces are arranged so that diametrically opposed segments have substantially equivalent axial dimensions. The relatively massive end of the pole faces correspond in shape with permanent magnets 4 and 5 so as to define equilibrium positions for the rotor member 2.

When no current is applied to solenoid 16, the rotors will find their equilibrium positions so as to complete the magnetic circuit. If a pulse of current is applied to the coils which magnetizes the electromagnetic stators 8 and 9 in the same direction as the magnetic circuit already created by the permanent magnet, the rotors will already be in an equilibrium position and will remain stationary. However, if a pulse of current of sufficient magnitude is applied to the coils which magnetizes the electromagnetic stator 8 in the opposite direction as that of the magnetic circuit already created by the permanent magnet, the rotors will be forced to rotate. Further, the rotation must be in a clockwise direction since the permanent magnets attached to the rotor will repel any part of the electromagnetic stator pole face which are of the same polarity as themselves. However, as soon as the shaft has rotationally advanced by a small amount, the permanent magnets will be attracted towards the other electromagnetic stator pole face (which has opposite polarity) with a force which will dependant upon the rate of taper of the claw face among other factors. If the current is then switched off, the shaft will come to a halt at the next equilibrium position, having rotated through 180°. This process may be repeated so that an actuation of the shaft through 180° is obtained with every current pulse of alternating polarity. This shaft may be used to drive, e.g. the valve means of an autosampler.

Alternative constructions of various parts of the rotary electromagnetic actuator may be contemplated without departing from the spirit of the invention. For example, two, three or more rotor members may be provided at various angular positions on the shaft. In this way a rotation of 90° (with four permanent magnets) may be achieved, or rotations through other angles depending on the number of magnets and the angular extent of the stator pole arm. Similarly, one, two, three, four or more electromagnetic stator assemblies may be provided. The decision as to how many rotor arms and electromagnetic stator assemblies are required depends upon the torque and angle of rotation desired, amongst other factors. It may be possible to replace the tapering claw-shaped actuators with arbitrarily shaped members of material of varying magnetic permeability.

Figure 9:
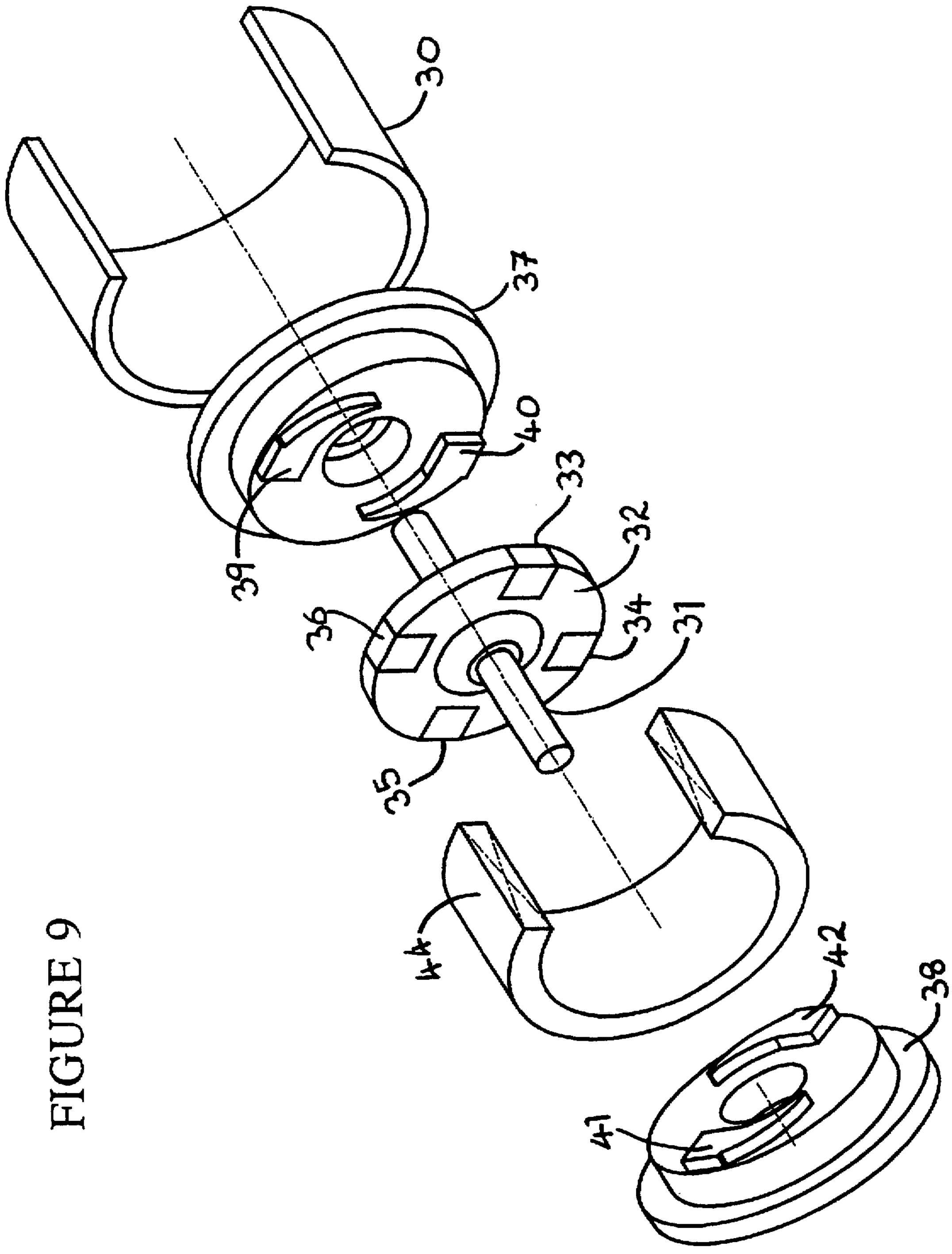
FIG. 9 is an exploded view of a further aspect of the invention.
Figure 10:
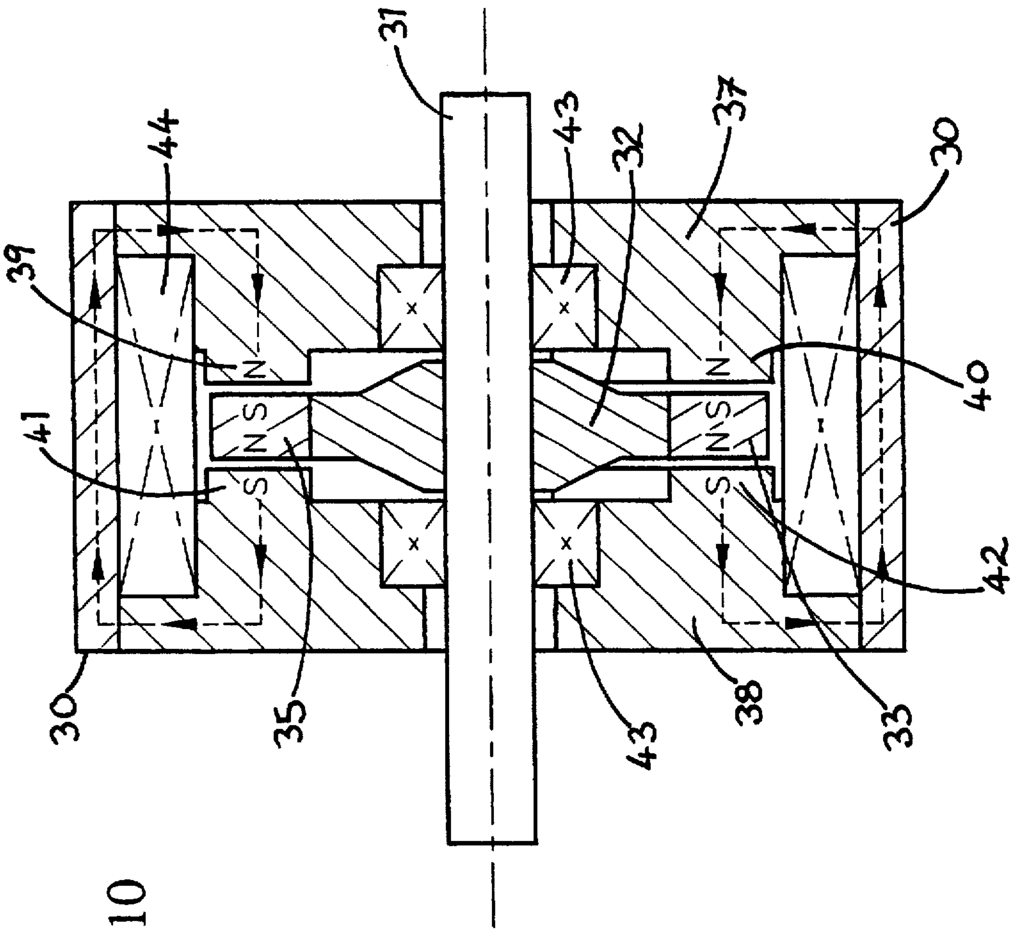
FIG. 10 is a cross-section of the device of FIG. 9 when assembled.

A further embodiment of the invention will now be described with reference to FIGS. 9 and 10.

In these figures, a sleeve housing 30 has rotatably mounted within it a non-magnetic shaft 31 upon which is fixedly mounted a rotor member 32, also made of non-magnetic material. Permanent magnets 33, 34, 35 and 36, made of e.g. Neodymium Iron Boron are attached to the rotor member 32, at angularly displaced locations around the circumference. The magnetic axes of magnets 33, 34, 35 and 36, are aligned with the shaft axis and arranged so that adjacent magnets have opposite polarities.

Two magnetically permeable stator end plates 37 and 38 are fixedly mounted to the sleeve housing. Each end plate has two shaped pole pieces (39, 40, 41, 42) angularly separated by substantially 180°. The pole pieces are shaped to have claw-shaped profiles curving around shaft 31. The pole pieces on opposite end plates are positioned to face each other, with the claws tapering in the same direction. The relatively massive portions of the pole faces correspond in profile with permanent magnets 33, 34, 35 and 36 so as to define equilibrium positions for the rotor assembly. Bushings 43 (FIG. 10) allow rotation but prevent axial movement of the rotor assembly.

Solenoid coil 44 (partially cut away in FIG. 9) surrounds the stator end plates and rotor assembly and is in turn surrounded by the housing sleeve 30, such that when a current flows the coil generates an electromagnetic field. When no current is applied to solenoid 44, the rotor will find its equilibrium position so that a magnetic circuit is completed. If a pulse of current is applied to the coil which magnetizes the electromagnet pole pieces in the same direction as the magnetic circuit already created by the two permanent magnets, the rotor will already be in an equilibrium position and will remain stationary.

However, if a pulse of current of sufficient magnitude is applied to the coil which magnetizes the electromagnet pole pieces in the opposite direction to that of the magnetic circuit already created by the permanent magnets, the rotor will be forced to rotate. Further, the rotation must be in an anticlockwise direction since the permanent magnets attached to the rotor will repel any part of the electromagnet pole faces which are of the same polarity as themselves. However, as soon as the shaft has rotationally advanced by a small amount, the other two permanent magnets will be attracted towards the electromagnet pole faces (because of their opposite polarity) with a force which will dependant upon the rate of taper of the claw among other factors. If the current is then switched off, the shaft will come to a halt at the next equilibrium position, having advanced through 90°. This process may be repeated so that an actuation of the shaft through 90° is obtained with every current pulse of alternating polarity. This shaft may be used to drive, e.g. the valve means of an autosampler.

Alternative constructions of various parts of the rotary electromagnetic actuator may be contemplated without departing from the spirit of the invention. For example, one, two, three or more claw-shaped pole pieces may be provided on each stator end plate. In this way a rotation of 180° (with one claw per end plate and two permanent magnets) may be achieved, or rotations through other angles depending on the number of magnets and the angular extent of the claw-shaped pole pieces. The decision as to how many permanent magnets and pole pieces are required depends upon the torque and angle of rotation desired, amongst other factors.

Figure 11:
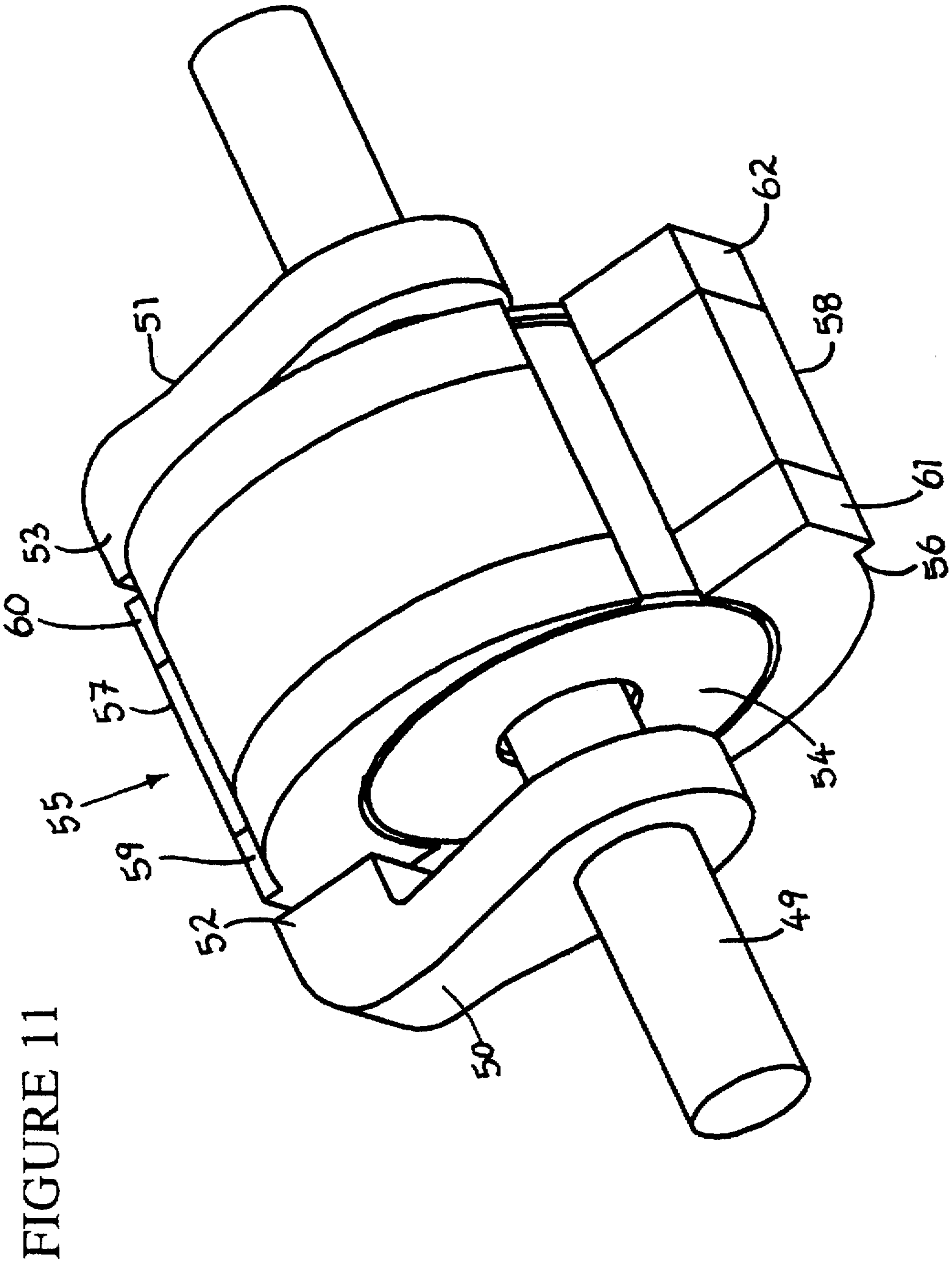
FIG. 11 is an isometric view of another embodiment of the invention.

A still further embodiment of the invention will now be described with reference to FIGS. 11, 12 and 13. In these figures, a shaft 49 made of magnetically permeable material has fixedly mounted to it two rotor members 50 and 51 made of soft iron. The tips 52, 53 of rotor members 50 and 51 are formed of the same material as the rotor members and may be formed integrally with said rotor members. The two rotor members extend so as to be parallel to each other. A coil 54 surrounds the shaft 49 but is not connected to it. Preferably coil 54 is fixed with respect to the housing (not shown). Fang-shaped armatures 55 and 56 surround the coil. The central portions 57, 58 of the armatures are formed of permanently magnetic material, such as Neodymium Iron Boron. The outer portions 59, 60, 61, 62 of armatures 55, 56 are made of a soft magnetic material. The armatures are shaped so as to taper from a relatively massive proximal end to a relatively less massive distal end. The operation of the device is similar to that described in the first embodiment above—when a pulse of current of sufficient magnitude, and of the correct polarity, is applied to the coil, the rotor is forced to advance in an anticlockwise direction until the next equilibrium position is attained.

Figure 12:
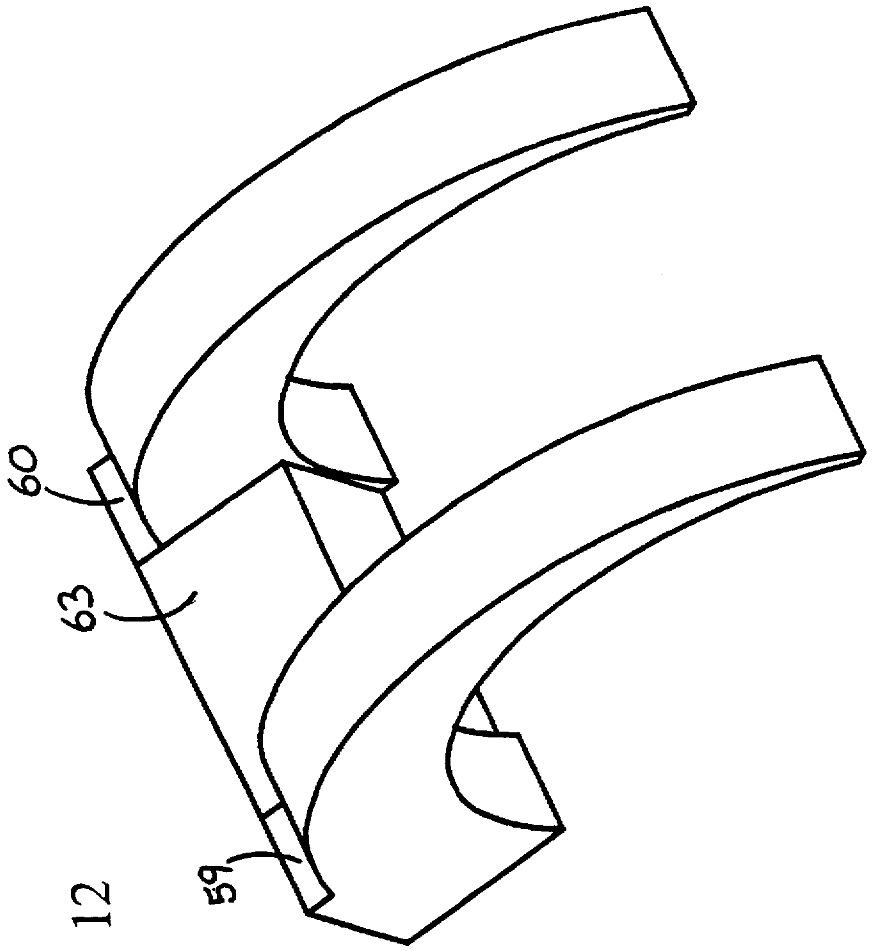
FIG. 12 shows an alternative construction of stator suitable for use in the device of FIG. 11.

An alternative construction for the armature is shown in FIG. 12. In this construction, the permanent magnet is a rectangular block 63 of e.g. Neodymium Iron Boron placed between claw-shaped soft iron members 59 and 60. This has the advantage that it is easier and cheaper to obtain magnets of rectangular shape, rather than machined into the complicated shape of FIG. 11. The mode of operation of the device is the same.

Although, in all the above described embodiments it is the stator member which is tapered; clearly an alternative realisation of the invention would be for the (or each) rotor member to be tapered.

As stated previously, many alternative constructions of various components may be apparent to the skilled man without departing from the scope of the invention. Also, different materials may be used to those given as examples above.

I claim:

1. A rotary magnetic actuator comprising:

(a) a rotatable shaft arranged to carry a rotor member to be rotatable about a rotational path;

(b) a stator member extending adjacent said rotational path of said rotor member;

(c) means for setting up a magnetic circuit comprising said rotor member and said stator member, the reluctance of said magnetic circuit being dependent on the relative rotational orientation of the rotor member relative to the stator member, said reluctance of said magnetic circuit , decreasing in a particular direction of rotation of the rotor relative to the stator to be a minimum at an equilibrium position, said rotor being normally biased to said equilibrium position;

(d) impelling means actuatable to rotate said rotor to advance away from said equilibrium position, advancement of said rotor subsequently causing said rotor to again become part of a magnetic circuit the reluctance of which decreases in the direction of rotation to a minimum at an equilibrium position such that said rotor becomes biased to a rotationally advanced equilibrium position; and wherein one of the group comprising said stator member and said rotor member includes a tapering portion extending about said shaft such that a gap is defined between said tapering portion and the other of said group comprising said stator member and said rotor member, said gap remaining substantially constant as said rotor member rotates adjacent said stator member.

2. A rotary actuator according to claim 1, wherein actuation of said impelling means reverses the direction of the magnetic field in a portion of the circuit, thereby to effect rotational advancement of said rotor member.

3. A rotary actuator according to claim 1, wherein the direction of rotational advancement of said rotor member for successive actuations of said impelling means of said rotor member is unidirectional.

4. A rotary actuator according to claim 1 wherein said impelling means comprises an electromagnet assembly actuatable to alter the polarity of a portion of the magnetic circuit.

5. A rotary actuator according to claim 4, wherein the polarity of the magnetic circuit in the stator member is reversed.

6. A rotary actuator according to claim 4, wherein said electromagnetic assembly comprises a coil wound around a portion of said stator member, said coil being supplied with current to effect actuation of said impelling means.

7. A rotary actuator according to claim 4, wherein said electromagnetic assembly comprises a coil having an armature extending thereabout, said armature comprising a portion of said stator.

8. A rotary actuator according to claim 4, wherein the polarity of the magnetic circuit in the rotor member is reversible.

9. A rotary actuator according to claim 8, wherein said electromagnet assembly comprises a coil wound around said shaft, said coil being supplied with current to effect actuation of said impelling means.

10. A rotary actuator according to claim 1, wherein said stator member includes said tapering portion extending about said shaft to be adjacent said rotational path of said rotor member.

11. A rotary actuator according to claim 1, wherein, upon actuation of said impelling means, rotational advancement of said rotor member and shaft causes the magnetic circuit comprising said rotor member to be temporarily broken.

12. A rotary actuator according to claim 1 comprising at least one further stator member spaced angularly about the axis of said shaft, subsequent actuations of said impelling means causing advancement of said rotor member alongside successive stator members to be biased to respective equilibrium positions therewith.

13. A rotary actuator according to claim 1 comprising one or more further rotor members spaced angularly about the axis of said shaft, subsequent actuations of said impelling means causing advancement of successive rotor members alongside a stator member to be biased to respective equilibrium positions therewith.

14. A rotary actuator according to claim 1, characterised in that one or more electromagnetic stators are disposed around the said shaft so as to define 2n stator regions (where n is an integer) radially disposed about the shaft, each said electromagnetic stator having an associated coil wherein when current is supplied to the coil said stator is temporarily magnetised, adjacent stators being magnetised with opposite polarities, at least a portion of each said rotor member being permanently magnetised, the temporary magnetisation of the stator regions being stronger than the permanent magnetisation of the rotor, wherein when current is supplied to the coil in one direction the shaft will tend to rotate until an equilibrium position is attained in which the permanently magnetised region of the rotor member is aligned with a temporarily magnetised stator region in a position of least reluctance, when the current is switched off the shaft will stay in the said equilibrium position in a position of least reluctance, and when current is supplied to the coil in the opposite direction, the temporary magnetisation of the stator region will be in the opposite direction to that of the permanent magnet, generating a repulsive force which impels the shaft to rotate again, until the permanent magnetic circuit becomes aligned with that of the next temporarily magnetised stator region, the shaft again tending to rotate until an equilibrium position is attained.

15. A rotary actuator according to claim 14, characterised in that each electromagnetic stator has an associated solenoidal coil wound so that a current applied to the coil induces a magnetic field in the said stator, each stator having at least one pole arm, each said pole arm extending in a plane which is substantially perpendicular to the shaft axis, and curving around the shaft axis with a radius of curvature such that the pole arm is immediately adjacent to the permanently magnetised portion of a rotor member during at least some of the rotation of the rotor member, the pole arm being constructed so that it tapers from a relatively massive proximal end to a relatively less massive distal end so as to form a claw-shaped pole arm.

16. A rotary electromagnetic actuator according to claim 15, characterised in that the stator is L-shaped, the base of the L extending in a direction substantially parallel to the axis of the shaft and having the solenoidal coil wound around it, the arm of the L forming the claw-shaped pole arm of the electromagnetic stator.

17. A rotary electromagnetic actuator according to claim 15 characterised in that the stator is U-shaped, the base of the U extending in a direction substantially parallel to the axis of the shaft and having a solenoidal coil wound around it, each arm of the U forming a claw-shaped pole arm of the electromagnetic stator.

18. A rotary actuator according to claim 14, characterised in that one stator member is provided, the stator having an associated solenoidal coil wound so that a current applied to the coil induces a magnetic field in the said stator, the stator having two pole faces, the pole faces extending cylindrically around the shaft axis, each said rotor member rotating within the cylindrical gap created by the stator, the permanently magnetised portion of a rotor member being adjacent to a pole f ace during the rotation of the rotor member, each pole face being shaped so that it tapers from a relatively massive end to a relatively less massive end.

* * * * *